United States Patent
Gierl et al.

(10) Patent No.: US 7,065,217 B2
(45) Date of Patent: Jun. 20, 2006

(54) APPARATUS AND METHOD FOR MULTICHANNEL SOUND REPRODUCTION SYSTEM

(75) Inventors: Stefan Gierl, Karlsruhe (DE); Christoph Benz, Ohlsbach (DE); Hans-Juergen Nitzpon, Waldbronn (DE); Andreas Koerner, Karlsruhe (DE)

(73) Assignee: Harman/Becker Automotive Systems (Becker division) GmbH, Karlsbad (DE)

( * ) Notice: Subject to any disclaimer, the term of this patent is extended or adjusted under 35 U.S.C. 154(b) by 448 days.

(21) Appl. No.: 10/092,374

(22) Filed: Mar. 5, 2002

(65) Prior Publication Data

US 2002/0146134 A1 Oct. 10, 2002

(30) Foreign Application Priority Data

Mar. 5, 2001 (DE) .......................... 101 10 422

(51) Int. Cl.
*H04H 5/00* (2006.01)

(52) U.S. Cl. ................. 381/10; 381/17; 381/2
(58) Field of Classification Search ............ 381/10, 381/11, 13, 14, 16, 17, 2
See application file for complete search history.

(56) References Cited

U.S. PATENT DOCUMENTS

| | | | |
|---|---|---|---|
| 4,833,715 A | * 5/1989 | Sakai ............................ 381/17 |
| 5,172,415 A | 12/1992 | Fosgate | |
| 5,253,299 A | * 10/1993 | Ishida et al. ................... 381/13 |
| 5,455,866 A | * 10/1995 | Ohashi ......................... 381/10 |
| 5,636,249 A | 6/1997 | Roither ........................ 375/282 |
| 5,701,345 A | * 12/1997 | Howlett et al. ............... 381/13 |
| 6,275,589 B1 | 8/2001 | Spille | |
| 6,535,608 B1 | * 3/2003 | Taira ............................ 381/17 |

FOREIGN PATENT DOCUMENTS

| | | |
|---|---|---|
| DE | 4207492 | 9/1993 |
| DE | 4442147 | 6/1996 |
| DE | 19932635 | 8/2000 |
| JP | 63177635 | 7/1988 |
| JP | 01277032 | 11/1989 |

* cited by examiner

*Primary Examiner*—Brian T. Pendleton
(74) *Attorney, Agent, or Firm*—O'Shea Getz & Kosakowski, P.C.

(57) ABSTRACT

The sound reproduction of a multichannel sound reproduction system with a plurality of speakers which is connected to the output of an FM stereo receiver is controlled by a control signal derived from the reception quality. Preferably, the control signal from the FM stereo receiver for controlling the stereo and mono components is also employed to control the multichannel sound reproduction system. For example, stereo, pseudo-stereo or mono reproduction are provided in the multichannel sound reproduction system in response to the stereo component within the output signal.

8 Claims, 1 Drawing Sheet

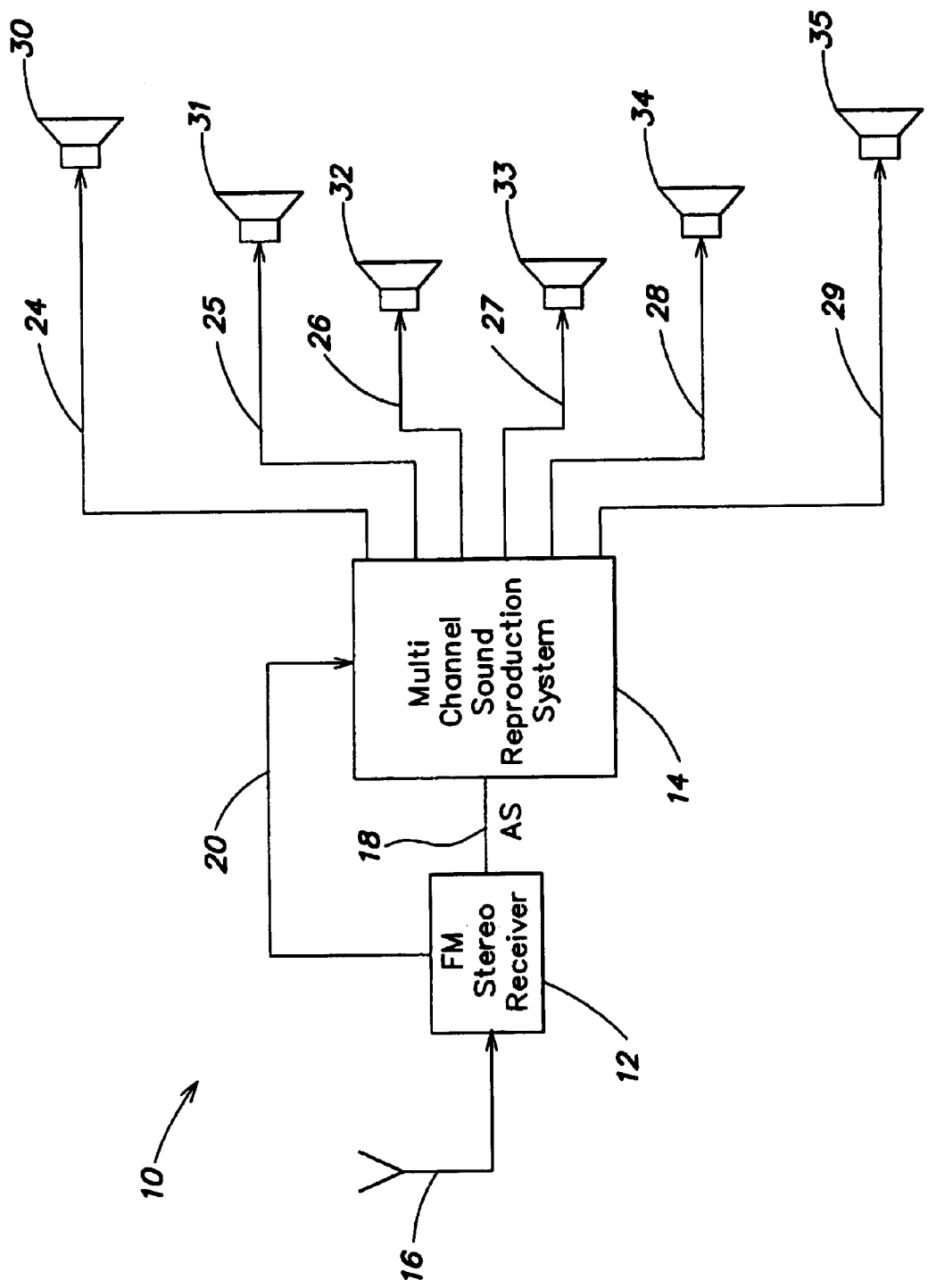

APPARATUS AND METHOD FOR MULTICHANNEL SOUND REPRODUCTION SYSTEM

BACKGROUND OF THE INVENTION

The invention relates to an audio system, and in particular to an audio system and method that includes an FM receiver that provides an audio signal and a reception signal to a multichannel sound production system. The multichannel sound production system provides a plurality of speaker output signals encoded in response to the reception signal.

FM stereo receivers are often equipped with a control unit that controls the stereo and mono components within its audio output signal in response to the reception quality. The term used in this regard is "channel separation" which is especially suitable for use in FM stereo receivers in vehicles, since the reception quality for stereo reception is often not sufficient due to the conditions under which the vehicle is driven at any given time. For this reason, the stereo component in the reproduced signal is reduced when reception conditions worsen, while the mono component is simultaneously increased. This shift from stereo to mono during poor reception conditions may reach the point of complete mono reproduction.

A multichannel sound reproduction system with a plurality of speakers may be connected to this type of FM stereo receiver. The reproduction system generates a plurality of reproduction signals for a plurality of speakers to improve the spatial acoustic pattern from the audio output signal supplied by the FM stereo receiver. However, when the stereo component in the audio output signal from the FM stereo receiver decreases, while the mono component increases, the perceived audio quality of the spatial acoustic pattern of the multichannel reproduction decreases—with the ultimate result often being a complete breakdown of the spatial acoustic pattern. As a result, strong fluctuations in reception quality during mobile operation result in an unacceptable drift in the acoustic pattern.

Therefore, there is a need to improve the acoustic pattern for a multichannel reproduction system connected to an FM stereo receiver, in response to a degrading stereo signal, and to reduce/prevent the drift in the acoustic pattern under conditions of fluctuating reception quality.

SUMMARY OF THE INVENTION

Briefly, according to an aspect of the invention, an audio system includes an FM receiver that provides an audio output signal to a multichannel sound reproduction system. The FM receiver also provides a control signal indicative of the reception quality of the audio signal. The multichannel sound reproduction system provides a plurality of speaker output signals indicative of the audio output signal, wherein the spatial pattern associated with the plurality of speaker output signals is set in response to the control signal.

The audio system monitors reception quality, and sets its output signals accordingly to improve the acoustic pattern for a multichannel reproduction system connected to an FM stereo receiver, in response to a degrading stereo signal, and to prevent the drift in the acoustic pattern under conditions of fluctuating reception quality.

The control signal is indicative of reception quality (e.g., the reception field strength or the reception level of the FM stereo receiver). The control signal controls the sound reproduction of the multichannel sound reproduction system.

In one embodiment, the FM receiver provides the control signal, which also controls the stereo and mono components within its audio output signal. Significantly, in this embodiment no additional control signal is required to control the multichannel sound reproduction system, since the control signal within the FM receiver used to control the stereo and mono components is indicative of the reception quality.

In an alternative embodiment, the control signal for controlling the multichannel sound reproduction system may be derived from one of the numerous quality signals generated by the tuner of the FM stereo receiver.

In yet another embodiment the sound reproduction of the multichannel sound reproduction system can be controlled in response to the stereo component within the audio output signal from the FM stereo receiver.

These and other objects, features and advantages of the present invention will become more apparent in light of the following detailed description of preferred embodiments thereof, as illustrated in the accompanying drawings.

DETAILED DESCRIPTION OF THE INVENTION

The FIGURE is block diagram illustration of an audio system 10 that includes an FM receiver 12 and a multichannel sound reproduction system 14. The receiver 12 receives a signal on a line 16 (e.g., from an antenna), and provides an audio output signal on a line 18 to the multichannel sound reproduction system 14. The FM receiver 12 also provides a control signal on a line 20, indicative of the reception quality of the audio output signal on the line 18.

The multichannel sound reproduction system 14 provides a plurality of speaker output signals on lines 24–29 to a plurality of speakers 30–35 respectively. The multichannel sound reproduction system controls the spatial pattern of the speaker output signals in response to the control signal on the line 20. For example, when the stereo component in the output signal of the FM stereo receiver 12 falls below a specified threshold value in the multichannel sound reproduction system, stereo reproduction may occur.

In place of stereo reproduction, pseudo-stereo reproduction or mono reproduction may be produced in the multichannel sound reproduction system. In the event the stereo component in the output signal of the FM stereo receiver falls below a first specified threshold value, it is especially advantageous to provide for stereo reproduction. When the stereo component in the output signal of the FM stereo receiver falls further to a level below a second specified threshold value, the multichannel sound reproduction system switches to pseudo-stereo reproduction. Similarly, if the stereo component in the output signal of the FM stereo receiver 14 falls below a third specified threshold value, the multichannel sound reproduction system switches over from pseudo-stereo reproduction to mono reproduction. As the stereo component in the output signal of the FM stereo receiver increases, the system in turn switches back to pseudo-stereo or stereo reproduction in accordance with the specified threshold values.

The control signal on the line 20 may, for example, be the control signal generated in the FM stereo receiver 12 to control the stereo and mono components within the output signal on the line 18. Alternatively, the control signal on the line 20, may be derived from one of the numerous quality signals from the tuner of the FM stereo receiver 12.

The technique of the present invention is especially well suited for use in motor vehicles since the receiver constantly encounters fluctuating reception conditions. However, the technique of the present invention may of course also be used in fixed multichannel sound reproduction systems, since the reception quality may drop below critical values for fixed systems as well (e.g., as a result of weather phenomena or due to defective transmitters which transmit only at low field strength).

Although the present invention has been shown and described with respect to several preferred embodiments thereof, various changes, omissions and additions to the form and detail thereof, may be made therein, without departing from the spirit and scope of the invention.

What is claimed is:

1. An audio system that provides a plurality of speaker output signals to a plurality of loud speakers, the audio system comprising:
    an FM receiver that receives an input signal and demodulates the input signal to provide an audio output signal, and also provides a control signal indicative of the reception quality of the audio output signal; and
    a multichannel sound reproduction system that receives the audio output signal and the control signal, and provides the plurality of speaker output signals where the sound reproduction associated with the plurality of speaker output signals is set by the multichannel sound reproduction system as a function of the control signal, such that stereo reproduction is provided when the control signal value lies between a first threshold value and a second threshold value, pseudo-stereo reproduction is provided when the control signal value lies between the second threshold value and a third threshold value, and mono reproduction is provided when the control signal value lies below the third threshold value—the first threshold value being greater than the second threshold value, and the second threshold value being greater than the third threshold value.

2. The audio system of claim 1, wherein the control signal is derived from a quality signal generated from a tuner of the FM stereo receiver.

3. The audio system of claim 1, where the control signal is indicative of the reception field strength of the input signal.

4. The audio system of claim 1, where the control signal is indicative of the reception level of the FM receiver.

5. Method for controlling a multichannel sound reproduction system with a plurality of speakers which is connected to the output of an FM stereo receiver that controls the stereo and mono component in the output signal in response to the reception signal,
    where, a control signal derived from the reception quality controls the sound reproduction of the multichannel sound reproduction system, where stereo reproduction occurs when the stereo component in the output signal of the FM stereo receiver lies below a first threshold value, pseudo-stereo reproduction occurs when the stereo component lies below a second threshold value, and mono reproduction occurs when the stereo component lies below a third threshold value—the first threshold value being greater than the second, and the second being greater than the third.

6. The method of claim 5, where the control signal to control the multichannel sound reproduction system is derived from a quality signal generated from the tuner of the FM stereo receiver.

7. An audio system, comprising:
    an FM stereo receiver that provides an audio output signal and a control signal indicative of the reception quality of the audio output signal;
    a multichannel sound reproduction system with a plurality of speakers which is connected to the output of an FM stereo receiver in which the stereo component and the mono component are controlled in the output signal in response to the reception signal, where the control signal derived from the reception quality is provided to control the sound reproduction of the sound reproduction system, such that stereo reproduction is provided when the stereo component in the output signal of the FM stereo receiver lies below a first threshold value, pseudo-stereo reproduction is provided when the stereo component lies below a second threshold value, and mono reproduction is provided when the stereo component lies below a third threshold value—the first threshold value being greater than the second threshold value, and the second threshold value being greater than the third threshold value.

8. The multichannel sound reproduction system of claim 7, where the control signal to control the multichannel sound reproduction system is derived from a quality signal generated from the tuner of the FM stereo receiver.

* * * * *

UNITED STATES PATENT AND TRADEMARK OFFICE
CERTIFICATE OF CORRECTION

| | | |
|---|---|---|
| PATENT NO. | : 7,065,217 B2 | Page 1 of 1 |
| APPLICATION NO. | : 10/092374 | |
| DATED | : June 20, 2006 | |
| INVENTOR(S) | : Gierl et al. | |

It is certified that error appears in the above-identified patent and that said Letters Patent is hereby corrected as shown below:

<u>Column 3</u>

In the claims, claim 2, line 37, delete "wherein" and insert --where--

Signed and Sealed this

Twenty-second Day of August, 2006

JON W. DUDAS
*Director of the United States Patent and Trademark Office*